INVENTORS.
FRANK B. SPROW,
GRADY W. HARRIS,
BY
Sylvester H. Brock Jr
ATTORNEY.

United States Patent Office 3,575,847
Patented Apr. 20, 1971

3,575,847
USE OF SPHERICAL CATALYST IN COAL EXTRACT HYDROGENATION
Frank B. Sprow, Baytown, Tex., and Grady W. Harris, Cambridge, Mass., assignors to Esso Research and Engineering Company
Filed Dec. 5, 1968, Ser. No. 781,475
Int. Cl. C10g *13/02*
U.S. Cl. 208—112                7 Claims

ABSTRACT OF THE DISCLOSURE

Coal extracts containing suspended solids are hydrotreated in a fixed-bed downflow reactor. Bed plugging is minimized by using substantially spherical catalyst granules having a minimum diameter at least ten times as great as the maximum dimensions of the suspended solids and maintaining a flow rate above the minimum at which occlusion of the bed results, preferably at least 1000 pounds per hour per square foot.

THE DRAWINGS

Figure 1:
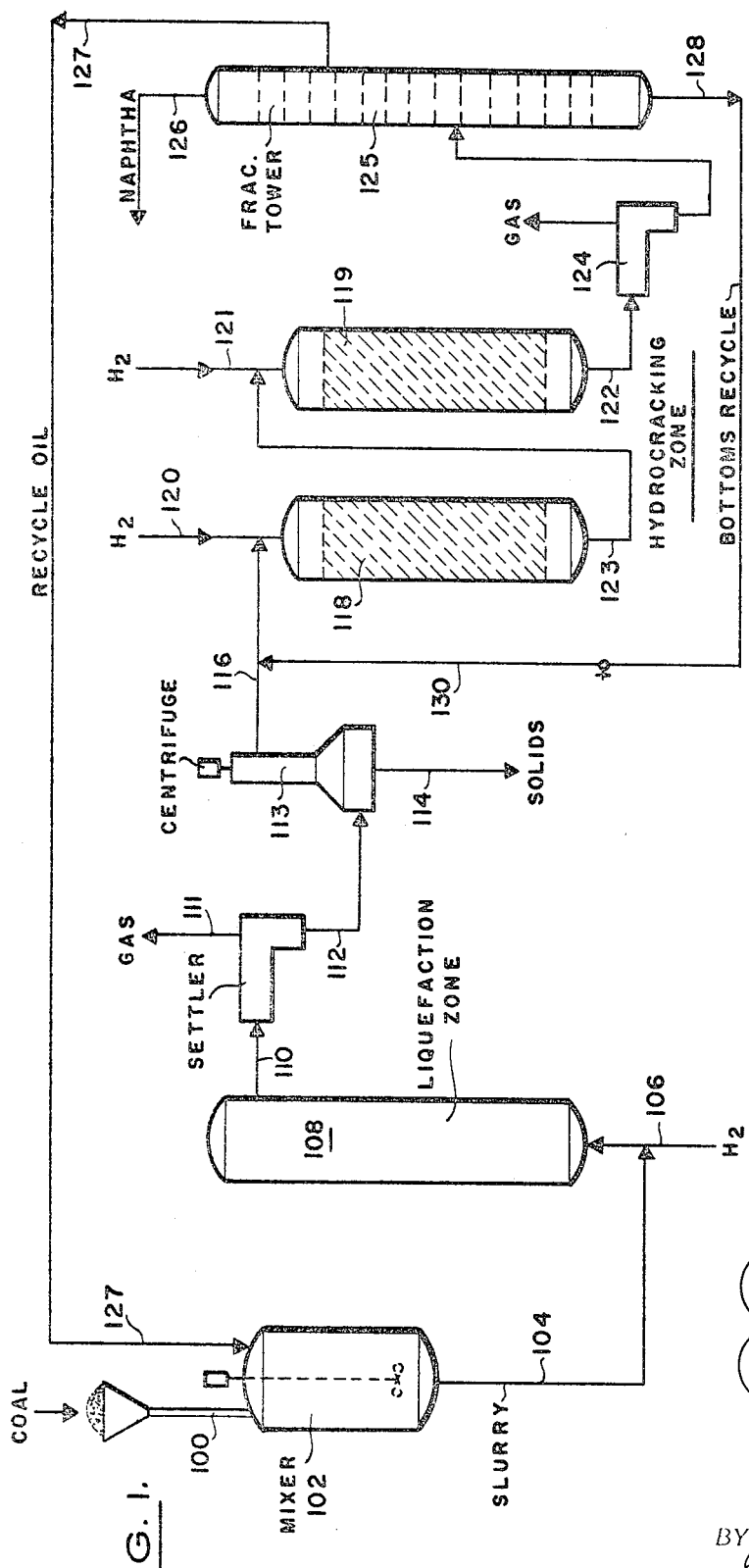
Figure 3:
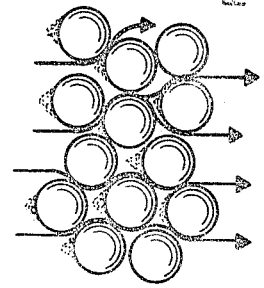

FIG. 1 is a schematic flow diagram of the process of the present invention;

FIp. 2 is a representation of the occlusion-prone tendency of the commonly used extrudate catalyst; and FIG. 3 is a representation of the occlusion-resistant nature of spherical catalyst granules.

THE SPECIFICATION

In the upgrading of coal by hydrogen transfer and cracking to obtain liquid fuels such as gasoline and kerosene, various steps are carried out for transferring hydrogen to the basic coal molecules, for breaking the coal molecules into smaller fragments, and for removing sulfur and nitrogen from the products. The basic coal liquefaction step may be carried out in a number of ways, preferably by using a hydrogen donor solvent, such as hydrogenated creosote oil or the hydrogenated product boiling from 350° to 750° F. which is obtained in the liquefaction of coal. Extraneous molecular hydrogen may be added to the liquefaction zone, if desired. All of this, directed to basic liquefaction of coal, is old in the art as disclosed in various patents such as U.S. 3,018,241 and 3,117,921.

The resultant product from coal liquefaction contains solvent, dissolved coal, some cracked and hydrogenated products of coal, undissolved residue, and ash. The undissolved residue and ash are separated from the extract and hydrogen-depleted solvent by centrifugation, filtration, or equivalent solids-liquid separation processes. The clarified liquid, from which the majority of undissolved solids has been removed, is not absolutely free of suspended solids but does contain from 0.5 to 15 weight percent of solids, mostly undissolved compounds and some ash. In the hydrocracking of this clarified liquid, it has been found that the suspended solids tend to settle out within the catalyst bed, and ultimately cause the effectiveness of the bed to be substantially reduced.

The deposition of particles within a stationary catalyst bed is somewhat like filtration, in that various of the flow channels are plugged gradually by deposited solids which then cause the liquid to flow through more constrained flow paths and contact successively smaller areas of exposed catalyst surface. Since the effectiveness of catalyst is basically dependent upon the amount of catalyst surface which is contacted by the reactants, such a deposition and filtration effect is highly deleterious. This problem has been approached from another viewpoint by use of a liquid-fluidized bed. However, this approach provides a well-mixed reactor and does not allow progressive conversion of feedstock as does a stationary bed. Thus, the present invention is an important development in the field of hydrotreating coal extracts.

It has been found by the present invention that the deposition of solids within the catalyst bed can be substantially reduced and the efficiency of the bed thereby substantially increased by utilizing catalyst granules which are substantially in the form of spheres, so that the areas of contact between granules are substantially reduced and the positions at which the solids could be occluded and settle-out are likewise reduced. Further, it has been found that by maintaining a minimum rate of flow through the bed, the steady-state condition at which the solid particles are carried through without deposition is reached without undue plugging of flow channels and the efficiency of the bed is thereby increased.

A better understanding of the present invention can be reached by analogy with bed-type filtration. Beds of particulate solids have long been used in filtration, and are based upon the phenomenon that entrained solids tend to bridge and seal off the interstices in the granular bed, thereby forming resistances or barriers to the further flow of solids through the passages between the granules, until the velocity of flow through the remaining passages reaches a critical minimum above which no deposition of particles takes place. The filtration effect can also lead to a complete occlusion of the bed, after which neither the liquid nor the solids in liquid can pass through the bed. In the present invention, wherein the bed is catalytic, the filtration effect may have a number of deleterious results:

(1) There is an increase in pressure drop across the catalytic reactor, raising the pumping costs;

(2) The deposition of solids in the catalyst pores causes catalyst deactivation;

(3) The limitation of flow through a smaller number of channels decreases the amount of catalyst surface which is exposed to the reactants, decreasing catalyst utilization; and (4) There is a possibility of complete plugging of the catalyst bed, necessitating the shutdown of the entire unit.

The present invention, as will be hereinafter shown, provides the advantages of allowing operation on streams containing more solids, allowing the upstream solids separation equipment to be less burdened and allowing the use of less costly equipment. It further reduces bypassing of catalyst by minimizing the occlusion of flow paths by deposited solids. Finally, it reduces the overall pressure drop, yielding longer run lengths at decreased pumping costs.

The present invention will be described in the following specification by separately discussing the various areas of interest, particularly the feedstock, the catalyst, the reaction to be carried out, and experimental data which shows that the invention is in fact effective.

The feedstock

Coal extract is preferably obtained by the hydrogen-donor extraction process using hydrogenated creosote oil or a similar fraction recovered from coal extraction and hydrocracking. The overall process whereby the feedstock is obtained can be better understood by reference to FIG. 1 of the drawings wherein raw coal is seen to be fed by way of line 100 into a mixer 102 wherein a slurry is created and withdrawn by way of line 104. Any suitable coal-like material can be used, for example, subbituminous coal, bituminous coal, lignite and asphalt. The coal is generally ground to a particle size of about 8 to 300 mesh, and may be dried before it is fed into the mixer 102.

The slurry may be mixed with hydrogen (introduced by way of line 106) and introduced into a liquefaction reactor 108. Within the liquefaction reactor, the coal is allowed to dissolve under conditions of high temperature and pressure, such as a temperature within the range from 650° to 850° F. and a pressure from 350 to 2500 p.s.i.g. The hydrogen treat rate (if hydrogen is used) may be fairly low, and may suitably range from 100 to 1000 s.c.f./b. of total slurry charge. In the liquefaction reactor, the coal is depolymerized and partially thermally cracked, and a product is withdrawn by way of line 110 which comprises the coal extract, depleted hydrogen-donor solvent and undissolved solids. The hydrogen and noncondensable gases are separated from the liquid and solid components and are removed by way of line 111 while the slurry is carried by line 112 to a solids-liquid separation unit such as the centrifuge 113.

Solids are removed from the centrifuge by way of line 114, and the clarified liquid is passed by way of line 116 into a hydrocracking zone, suitably comprising two reactors, 118 and 119. In the hydrocracking zone, the clarified oil is contacted with hydrogen introduced by way of lines 120 and 121 and is passed sequentially (via line 123) in downflow across stationary beds of spherical catalyst granules in the reactors 118 and 119. The clarified oil is preferably in the liquid phase, but may be in the mixed liquid-and-vapor phase, while the hydrogen obviously will be maintained in the gas phase and dissolved in the liquid phase. The catalyst within the hydrocracking reactor is substantially spherical, and is at least ten times larger in minimum diameter than the largest dimension of the particles being entrained in the clarified liquid. The products of the hydrocracking reactor are removed by way of line 122, the hydrogen separated therefrom by means 124, and the liquid is fractionated in tower 125 to obtain a naphtha stream which is removed by way of line 126 for further treatment, a recycle oil which is removed by way of line 127 and a bottoms products which is removed by way of line 128. The bottoms stream is preferably recycled to extinction by way of line 130.

The recycle oil in line 127 has received hydrogen by reaction in the hydrocracking reactors 118 and 119 and is therefore suitable for use as a hydrogen donor solvent. This material, boiling within the range from 350° to 750° F. is recycled and admitted into the mixer 102 as a slurrying oil for the coal 100, as well as providing the donor hydrogen for the liquefaction reaction.

The feedstock into the hydrocracking reactor is the material with which the present invention is particularly concerned. This feedstock, the clarified oil obtained as a coal extract, contains both the dissolved coal and the hydrogen-depleted solvent. This material also contains suspended particles which were not removed in the centrifuge 112. The material may contain from 0.5 to 15 weight percent solids (usually about 1.0 weight percent) having a particle size from a minimum of about 1 micron to about as large as 200 microns. Generally, in choosing the size of the catalyst spheres, the largest 5% of the particles will provide a good guide in determining the critical dimension of suspended particles. The largest 5% generally will have a maximum dimension (average) of about 150 microns.

As exemplary of the feedstocks which would be charged into the hydrocracking zone are extract product clarified oils such as the ones shown below in Table I.

TABLE I.—HYDROCRACKING ZONE FEED GLASS SPIRAL DISTILLATION [1]

| I | | II | |
|---|---|---|---|
| Temperature, ° F. | Cumulative, weight percent | Temperature, ° F. | Cumulative, weight percent |
| 400 | 2.6 | 400 | 0.6 |
| 500 | 12.3 | 472 | 4.0 |
| 600 | 21.9 | 526 | 8.2 |
| 700 | 30.0 | 590 | 12.5 |
| 800 | 37.0 | 640 | 16.8 |
| 90 | 45.0 | 700 | 22.0 |
| 1,200 | 59.0 | 703 | 21.3 |
|  |  | 712 | 22.6 |
|  |  | 786 | 28.1 |
|  |  | 810 | 30.5 |

|  | I | II |
|---|---|---|
| Specific gravity, 60/60° F | 1.1058 | 1.1587 |
| Elemental analysis, weight percent: |  |  |
| Carbon | 89.85 | 90.40 |
| Hydrogen | 7.51 | 6.8 |
| Oxygen | 1.7 | 1.4 |
| Nitrogen | 0.72 | 0.89 |
| Sulfur | 0.39 | 0.30 |
| Total | 100.17 | 99.84 |
| MEK insolubles, weight percent | 0.04 | 0.02 |
| Benzene insoluble, weight percent | 6.37 | 11.89 |
| Ash on benzene insoluble, weight percent | 0.31 | 0.42 |
| Metals, p.p.m.: |  |  |
| Nickel | 0.95 | 1.30 |
| Iron | 14.0 | 26.0 |
| Vanadium | 2.2 | 2.5 |

[1] Corrected to 760 mm.

The clarified oils in Table I were admixed with bottoms from the fractionation system under operating conditions wherein the fractionator bottoms were recycled to extinction.

The hydrocracking reaction which is carried out in the reaction zone is carried out at a temperature from 650° F. to 900° F., preferably 750° F., a pressure of 1000 to 4000 p.s.i.g., preferably 2000 p.s.i.g., a residence time within the reactor of 30 to 300 minutes, preferably 60 minutes, and a hydrogen rate from 3000 to 8000 s.c.f./b. (preferably 5000 s.c.f./b.), based on the total volume of liquid being charged to the hydrocracking reactor. The flow rate within the hydrocracking reactor is critical in that a sufficient velocity must be maintained to prevent the suspended solids from unduly settling out within the bed. This critical velocity varies with the size of the catalyst spheres, the size and constitution of the particles which are suspended in the liquid, and the nature of the liquid, and can be experimentally determined for each unit. The minimum velocity, however, is about 1000 pounds per square foot per hour. A velocity from about 1000 pounds per square foot per hour to about 4600 pounds per square foot per hour will be suitable for most clarified oils. A minimum of 1500 pounds per square foot per hour is preferred.

The catalyst to be used is substantially spherical, with a minimum diameter at least ten times as great as the average maximum dimension of the largest 5% of the solid particles carried in the clarified oil. The catalyst may have only a hydrogenation activity or it may have both hydrogenation and cracking activity. Where the catalyst has only a hydrogenating activity, thermal cracking will cause the reduction in average molecular weight, and the catalyst will assist in hydrogenating the fragments. Suitable catalysts are cobalt molybdate, nickel molybdate, nickel tungsten, and palladium. Various substrates can be used such as kieselguhr, alumina, silica, faujasites, etc. The cobalt molybdate catalyst is preferred, and may have 3.4 weight percent cobalt oxide, 12.8 weight percent molybdenum oxide, and 83 weight percent alumina. The catalyst may range from 2 to 5 weight percent cobalt oxide and from 10 to 15 molybdenum oxide, all as is well known in the art.

Generally, the size of the spheres will range from $\frac{1}{16}$ to $\frac{1}{4}$ inch. The minimum size is determined by the particles which are being carried in the clarified oil, and generally may also be determined by the ease with which the spheres can be formed. For example, spherical catalyst of about 1/8 inch to 3/16 inch in diameter would be preferred both from the standpoint of the size of the particles in the clarified liquid and the ease of manufacture and handling of the resulting catalyst. Smaller spheres would tend to increase the pressure drop across the catalyst bed, even though there is an increase in the exposed catalyst area per unit volume.

The substantially spherical catalyst particles can be manufactured in a number of ways: spray-forming, tumbling, molding, etc. Preferably, the particles will be obtained by spraying the molten substrate into a cooling fluid (gas or liquid) so that it will solidify in substantially spherical shape. When this method is used, the particles will not be of uniform size, but the product will contain particles of different diameters. If desired, the particles can be separated by sieving so that a fairly uniform final product is obtained. Further, the individual particles, although avoiding the flat spots, sharp edges and straight sides of cylindrical extrudates, are not all actually perfect spheres but will include ovoid or ellipsoid shapes as well as spheres. This is acceptable so long as the bulk of the catalyst particles (e.g., at least 90%) do not have an eccentricity of more than 100% (i.e., the ratio of the maximum particle diameter to minimum particle diameter should not exceed 2:1). It is obvious that crushed particles (which have sharp edges that promote tight packing and resultant occlusion) are not suitable, even though the "diameter" ratio might be said to be within the above range.

As stated above, the catalyst size generally is chosen as a function of the size of the particles in the clarified oil. The minimum diameter of the catalyst should be at least equal to ten times the maximum dimension of the largest particles present in appreciable quantities. The upper limit on catalyst size appears to be based practically on the ability to handle catalyst and to avoid losing too much of the exposed surface per unit volume and may be about one-half to one inch in diameter.

Figure 2:
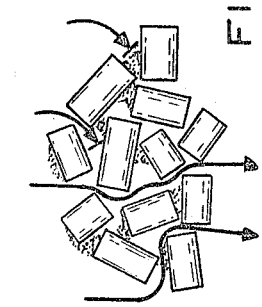

The operation of the present invention can be visualized by referring to FIGS. 2 and 3, which schematically illustrate the manner in which extruded catalyst and spherical catalysts would appear after a solids-containing fluid stream had been passed over the catalyst for an appreciable period of time.

In FIG. 2 it is seen that the large number of relatively horizontal areas which exist in the extruded cylindrical catalyst promote the deposition and collection of solid material which ultimately leads to a blocking of certain flow paths, so that the catalyst area exposed in the blocked flow paths becomes useless insofar as promoting the reaction is concerned. Both the flat ends of the cylinders and the relatively horizontal sides of the cylinders which are horizontally disposed would tend to encourage the deposition and collection of the suspended solids.

Referring to FIG. 3, by contrast, it is seen that only the upper portion of the sphere would allow the fines to collect, and as to the sloping surfaces other than the upper portion, the fines would be washed off by the flowing liquid before bridging could occur. Further, by reason of the spherical shape of the catalyst, the points of contact between the catalyst granules would be limited to a very small area in the case of spherical catalysts as opposed to the possibility of long lines of contact where cylindrical catalysts may be involved (for example, where two granules are parallel and side by side). In FIG. 3, the points of contact are not shown, in order to illustrate schematically the fact that no flow paths are blocked, but it is to be understood that the catalyst particles will be in contact in the bed.

Figure 4:
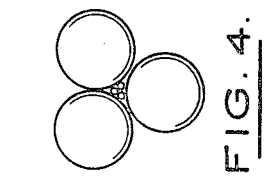

Referring now to FIG. 4, it is seen that the diameter of the suspended solids is a material factor in determining the diameter of spherical catalysts which would be suitable for use. As is seen in the diagrammatic representation of FIG. 4, when the solid particles have a diameter of about one-tenth of that of the spherical catalyst, bridging can occur at the area of most constriction, and therefore, the diameter relationship should be at least 10 to 1 and preferably greater than 10 to 1. Although the entrained solid particles are shown as being spherical in FIG. 4, it is to be understood that in the coal extract the particles are irregular in shape and would be less likely to bridge than would spherical particles of the same maximum dimension. Therefore, the relationship of 10 to 1 appears to be a satisfactory and workable ratio.

In order to illustrate the present invention, several examples are given hereinafter in order to show the advantages of using spherical catalysts rather than the commonly used cylindrical extrudate.

EXAMPLES

Example 1

An experimental fixed bed was set up that consisted of a 2-inch diameter Lucite column fitted with tapping at both ends for pressure measurements. The column, 36 inches high and packed with 1/8 inch cylindrical extrudate, was operated at ambient temperature and pressure. All of the runs were carried out with a 10 weight percent talc powder suspension in methanol, and methanol saturated nitrogen gas. Methanol was selected as the solvent because its surface tension and viscosity are similar to those at operating conditions of the clarified oil which will be treated in the hydrocracking reactor. The talc particle sizes, ranging from 2 to 17 microns, and with an average size of 8 microns, are comparable to the particle sizes of coal fines and ash expected in the centrifuge overflow. The liquid mass velocity ranged from 1000 to 3500 pounds per hour per square foot, and the nitrogen gas/liquid rate varied from 5:1 to 27:1 ACF (actual cubic feet) gas/ACF liquid. These are typical rates for use in the hydrocracking reactor.

The liquid suspension together with solvent saturated nitrogen entered at constant rates through the top of the column and flowed downward. The runs were continued until the column reached the equilibrium state, that is, no further increase in pressure drop was seen. After each run all solids deposited in the column were collected by washing the packing with clean methanol and the weight of solids obtained by evaporating the methanol. The pressure drop generally rose to an equilibrium value and then remained constant thereafter. At a rate of 1000 pounds per hour per square foot and a gas/liquids ratio of 5:1, the pressure drop increased in 8 hours to an equilibrium value about 70% higher than the initial value. At a liquid rate of 3500 pounds per hour per square foot, the equilibrium pressure drop was only about 10% higher than the initial value. However, the lower pressure drop is due to the channeling of the reactants past the catalyst without contacting all of the exposed area. The results of the various runs are shown below in Table II.

TABLE II

| Bed type | Liquid rate /hour/ft.² | gas/liquid volume ratio | Solid collected from bed, grams |
| --- | --- | --- | --- |
| 1/8" Extrudate | ¹ 1,000 | 10/1 | 77 |
| Do | ¹ 2,000 | 10/1 | 40 |
| Do | ¹ 4,600 | 10/1 | 17 |
| 3/16" Spheres | ² 1,500 | 10/1 | 43 |
| Do | ² 3,000 | 10/1 | 16 |
| Do | ² 4,600 | 10/1 | 7 |
| Do | ² 3,000 | 10/1 | 30 |

¹ 10 weight percent of 8 micron talc.
² 2 weight percent of 20 micron talc.

Example 2

In order to compare the performance of 1/8 inch extrudate with that of 3/16 inch catalyst spheres, a number of runs were made in the apparatus of Example 1 utilizing 2 weight percent talc in methanol, the talc having an average particle size of 20 microns. The results of these various runs are also given in Table II.

Referring to Table II it is seen that, for equivalent liquid rates, the spherical catalyst showed less solids accumulation than extruded catalyst even though the particles in the slurry were 2½ times larger than the particles in the slurry fed to the extruded catalyst. Note that at 4600 pounds per hour per square foot, the spherical catalyst collected only 7 grams of solids compared to 17 grams in the case of extruded catalyst.

Example 3

A pilot unit reactor treating clarified oil in a manner shown in FIG. 1 (except that only the first hydrocracking reactor was used) was charged with about 45 pounds of ⅛ inch extrudate of Nalco 471 cobalt molybdate catalyst. Feed rates ranged from 100 to 250 pounds per hour (1500 to 4000 pounds per hour per square foot) and resulted in greater than 44,000 pounds of cumulative charge containing approximately 66 pounds of ash. During 300 hours of operation, approximately 6 pounds of ash and 3 pounds of MEK (methylethyl ketone) insoluble non-ash constituents accumulated in the 39 pounds of ⅛ inch extruded catalyst. The pressure differential across the middle 7½ feet of the reactor increased from 10 inches of water initially to more than 1000 inches at the end of the run. The catalyst activity based on specific gravity reduction of a standard concentrate blend at standard conditions indicated at 42% decrease in activity. The runs were made at about 2000 p.s.i.g. and about 650° F., with a hydrogen rate of about 5000 s.c.f./b.

Example 4

A run similar to Example 3 was made, when utilizing spherical catalysts rather than the ⅛ inch extrudate. The reactor was charged with ³⁄₁₆ inch spherical catalyst, cobalt molybdate, equivalent to the Nalco 471 used in Example 3 and operated at 700° F., 2000 p.s.i.g. and 5000 s.c.f./b. After 453 hours, the catalyst had lost only 16% of its initial activity compared to the 42% loss in Example 3 after only 300 hours.

Having disclosed our invention, what is to be covered by Letters Patent should be limited not by the specific examples herein given, but solely by the appended claims.

We claim:

1. In the catalytic hydrogenation of a coal extract containing from 0.5 to 15 weight percent of suspended solids having a maximum dimension of 200 microns by contacting said extract with a catalyst and molecular hydrogen under hydrogenation conditions, the improvement which comprises:
    passing said solids-containing extract and said hydrogen in a downflow direction at a rate from 1000 to 4600 pounds per hour per square foot of nominal bed cross-section through a bed of substantially spherical hydrogenation catalyst granules,
    wherein the catalyst granules have a diameter at least ten times as large as the average maximum dimension of the largest 5% of said solids but no greater than ½ inch.

2. A method in accordance with claim 1 wherein the hydrogenation conditions include:
    a temperature from 650 to 900° F.,
    a pressure from 1000 to 4000 p.s.i.g.,
    a residence time in the reactor from 30 to 3000 minutes, and
    a hydrogen rate from 3000 to 8000 s.c.f./b.

3. A method in accordance with claim 2 wherein the catalyst is cobalt molybdate.

4. A method in accordance with claim 3 wherein the catalyst size is from ¹⁄₁₆ to ¼ inch in diameter.

5. A method in accordance with claim 4 wherein the hydrogenation conditions include a temperature of about 750° F., a pressure of about 2000 p.s.i.g. and a hydrogen rate of about 5000 s.c.f./b.

6. A method in accordance with claim 5 wherein the downflow rate is about 1500 lbs./hr./sq. ft.

7. A method in accordance with claim 6 wherein the eccentricity of the catalyst granules is no greater than 100%.

References Cited

UNITED STATES PATENTS

| | | | |
|---|---|---|---|
| 3,018,242 | 1/1962 | Gorin | 208—10 |
| 3,024,206 | 3/1962 | Duke | 252—477 |
| 3,453,202 | 7/1969 | Friedman et al. | 208—10 |

PAUL M. COUGHLAN, JR., Primary Examiner

R. BRUSKIN, Assistant Examiner

U.S. Cl. X.R.

208—108, 10